United States Patent
Bergman et al.

(10) Patent No.: US 8,619,131 B2
(45) Date of Patent: Dec. 31, 2013

(54) METHOD OF ILLUMINATING A 3D OBJECT WITH A MODIFIED 2D IMAGE OF THE 3D OBJECT BY MEANS OF A PROJECTOR, AND PROJECTOR SUITABLE FOR PERFORMING SUCH A METHOD

(75) Inventors: Anthonie Hendrik Bergman, Eindhoven (NL); Ramon Pascal Van Gorkom, Eindhoven (NL); Marcellinus Petrus Carolus Michael Krijn, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 809 days.

(21) Appl. No.: 12/678,521

(22) PCT Filed: Sep. 18, 2008

(86) PCT No.: PCT/IB2008/053796
§ 371 (c)(1),
(2), (4) Date: Mar. 17, 2010

(87) PCT Pub. No.: WO2009/037662
PCT Pub. Date: Mar. 26, 2009

(65) Prior Publication Data
US 2010/0194867 A1    Aug. 5, 2010

(30) Foreign Application Priority Data
Sep. 21, 2007   (EP) .................................... 07116899

(51) Int. Cl.
*H04N 9/47* (2006.01)

(52) U.S. Cl.
USPC ......................................................... 348/54

(58) Field of Classification Search
USPC ............................................ 348/54, 745, 744
See application file for complete search history.

(56) References Cited

U.S. PATENT DOCUMENTS

| 6,674,561 B2 * | 1/2004 | Ohnishi et al. ................. 359/238 |
| 7,148,933 B2 * | 12/2006 | Childers ........................ 348/745 |
| 7,234,819 B2 * | 6/2007 | Nonaka et al. .................. 353/69 |
| 7,270,417 B2 * | 9/2007 | Choi et al. ....................... 353/34 |

(Continued)

FOREIGN PATENT DOCUMENTS

| EP | 0933728 A1 | 8/1999 |
| EP | 0933728 A2 * | 8/1999 |

OTHER PUBLICATIONS

Debevec: "Pursuing Reality With Image-Based Modeling, Rendering, and Lighting"; Keynote Address-Second Workshop on 3D Structure From Multiple Images of Large-Scale Environments and Applications to Virtual and Augmented Reality (SMILE2), 13 page Document.

(Continued)

*Primary Examiner* — David Czekaj
*Assistant Examiner* — Tracy Li
(74) *Attorney, Agent, or Firm* — John F. Salazar; Mark L. Beloborodov

(57) ABSTRACT

The invention provides a method of illuminating a 3D object 10 with a modified 2D image of the 3D object 10. Further, the invention provides a dedicated projector 40 for performing this method. This projector 40 further comprises an image sensor 60 to capture a 2D image of the object, which may, after modification into the modified 2D image, be projected by the projector 40 on the 3D object 10.

5 Claims, 12 Drawing Sheets

(56) References Cited

U.S. PATENT DOCUMENTS

| | | |
|---|---|---|
| 7,273,279 B2 * | 9/2007 | Kobayashi et al. ............ 353/20 |
| 8,115,775 B1 * | 2/2012 | Bjorke ............................ 345/582 |
| 8,218,202 B2 * | 7/2012 | Hunter et al. .................. 358/450 |
| 2003/0034974 A1 | 2/2003 | Welch et al. |
| 2004/0028294 A1 * | 2/2004 | Fukuda ........................ 382/305 |
| 2004/0119723 A1 | 6/2004 | Inoue et al. |
| 2005/0116667 A1 * | 6/2005 | Mueller et al. ................ 315/312 |
| 2006/0020452 A1 * | 1/2006 | Nakatani et al. .............. 704/226 |
| 2007/0109296 A1 | 5/2007 | Sakagawa et al. |
| 2008/0044079 A1 * | 2/2008 | Chao et al. ................... 382/154 |
| 2008/0291342 A1 * | 11/2008 | Hirai ............................. 348/745 |

OTHER PUBLICATIONS

Raskar et al: "Interacting With Spatially Augmented Reality"; Proceedings of the First ACM International Conference on Virtual Reality, Computer Graphics and Visualization in Africa (Afrigraph), Nov. 2001, TR-2001-51, Feb. 2002, 9 page Document.

\* cited by examiner

METHOD OF ILLUMINATING A 3D OBJECT WITH A MODIFIED 2D IMAGE OF THE 3D OBJECT BY MEANS OF A PROJECTOR, AND PROJECTOR SUITABLE FOR PERFORMING SUCH A METHOD

FIELD OF THE INVENTION

The invention relates to a method of illuminating a 3D object, especially a 3D art object, with a modified 2D image of such a 3D object, by means of a projector which (in use) projects the modified 2D image of the 3D object on the 3D object. The invention further relates to a projector that is suitable for performing such a method.

BACKGROUND OF THE INVENTION

Objects illuminated with specific designs or graphics are known in the art. US 2003/0034974 for instance describes a computer-implemented method of animating a 3D physical object by first acquiring a 3D graphics model of the object. The concept of the invention described in this document is to replace a physical object having inherent color, texture, and material properties with a neutral object illuminated by projected imagery, thus reproducing the original or alternative appearance directly on the object. In this approach, the desired visual properties of the object are effectively "lifted" into the projector. Specifically, a computer-implemented method animates a 3D physical object by first acquiring a 3D graphics model of the object. The model is edited with graphics authoring tools to reflect a desired appearance of the object. The edited model is rendered as an image, considering a user location and a location of a virtual light. Then, intensity values of the image are corrected according to an orientation of a surface of the object and radiance at the surface. The 3D physical object can finally be illuminated with the corrected image to give the 3D physical object the desired appearance under the virtual light when viewed from the user location.

Further, US 2005/0116667 describes a tile lighting system in which an interior space of a tile is lit by LEDs, such as in a grid or edge-lit formation, and a light diffusing panel is disposed over the interior space. The tile lighting system can be combined with others to tile any surface, such as a floor, ceiling, wall, or building exterior. Lighting control signals can be supplied to generate a wide range of effects on the tile lighting units, including effects coordinated among different tile lighting units. Two- and three-dimensional embodiments are contemplated according to this document.

SUMMARY OF THE INVENTION

A disadvantage of the prior art systems is the rather complicated way in which images of the 3D object are obtained, such as for instance by a complete scanning of the 3D object, acquiring a 3D model, etc. A further disadvantage is that the methods of the prior art need man-made editing of the images made of 3D object. Therefore, the prior art methods are not readily suitable for an automized effect illumination of 3D (art) objects.

Hence, it is an aspect of the invention to provide an alternative method for the illumination of a 3D object with an image, which method preferably further obviates one or more of the above-described drawbacks. It is another aspect of the invention to provide an alternative projector, which preferably allows the method of the invention to be performed with such a projector.

According to a first aspect of the invention, there is provided a method of illuminating a 3D object at a location with a modified 2D image of the 3D object, using a projector arranged at a point of view, wherein the 3D object, in the absence of illumination of the 3D object with the modified 2D image by the projector, has, as viewed from the point of view, one or more features selected from the group consisting of (i) regions with specific textures, (ii) shadow regions, (iii) reflective regions, (iv) color regions and (v) regions other than the previously mentioned regions, wherein the method comprises:

a. providing a 2D image of the object captured by an image sensor from the point of view in the absence of illumination of the 3D object with the modified 2D image by the projector;
b. determining one or more 2D image regions on the 2D image corresponding to the one or more features selected from the group consisting of (i) regions with specific textures, (ii) shadow regions, (iii) reflective regions, (iv) color regions and (v) other regions at the 3D object;
c. modifying at least one of the one or more 2D image regions of the 2D image by changing one or more features selected from the group consisting of (i) color and (ii) brightness to obtain one or more modified image regions of the modified 2D image;
d. illuminating the 3D object by the projector by projecting the modified 2D image on the 3D object, wherein the projections of the one or more modified image regions at the 3D object substantially overlap with one or more of the regions at the 3D object.

Advantageously, the method provides an alternative method, which may relatively easily allow the creation of modified images with which the 3D object can be illuminated. Further, it may allow fully automated illumination, with modified images, of 3D objects, such as 3D art objects, which are illuminated with 2D images of such objects. In addition, complicated acquirement of images is not necessary.

According to another aspect of the invention, a projector is provided, the projector comprising a light source, a panel for displaying a modified 2D image and a lens, wherein the light source, panel and lens are arranged to project the modified 2D image by a beam of light, wherein the projector further comprises an image sensor with a window of view, wherein the beam of light and window of view at least partly overlap. In an embodiment, use is made of a digital projector.

Advantageously, the projector easily provides the possibility to perform the method of the invention. It may also allow the use at different places and illumination of different 3D objects, without complicated alignment of projector and object and without elaborate acquirement of images of the 3D object.

With the method and projector according to the invention, 3D objects, such as 3D art objects, may be illuminated with a manipulated image of the object itself, thereby providing spectacular effects, allowing a kind of living art, and adding an additional art dimension to the 3D art object. Such image (s) may be changed in time, subjected to random or predetermined manipulations, etc.

The change of one or more features selected from the group consisting of (i) color and (ii) brightness may be a random change, but may also be, in another embodiment, a predetermined change (of one or more regions on the 2D image of the 3D object). Further, also a combination of random changes and predetermined changes may be applied. The term "random" herein refers to a random selection of changing the color and/or changing the brightness. The term "predetermined" herein refers to a predetermined link between certain types of regions (on the 2D image) and the change in the color and/or the brightness. The phrase "a combination of random changes and predetermined changes may be applied" refers to modification of the 2D image into a modified 2D image (i.e. illumination of the regions specified herein by the projection of the modified 2D image on the 3D object) which may be performed subsequently or which may be performed at the same time.

In a specific embodiment, the phrase "(i) color" refers to a plurality of colors. In another embodiment "(ii) brightness" refers to a plurality of brightness intensities. In a specific embodiment, the phrase "one or more features selected from the group consisting of (i) color and (ii) brightness" refers to one or more features selected from the group consisting of (i) a plurality of colors and (ii) a plurality of brightness intensities. The term "color" herein further refers to any color (feasible with the projector), including white. This means that a red region might be illuminated with any color, including red light and white light. The term "brightness" refers to any brightness (feasible with the projector), including no illumination. This means that a certain region may be illuminated with light of a certain intensity, including no illumination. Hence, the modification of the 2D image, and thereby the illumination of the 3D object with the modified 2D image, leads in an embodiment to illumination of regions (as defined herein) with light selected from a matrix of colors and brightnesses. As mentioned above, the selection in which way a region may be illuminated (or not) with respect to color and brightness may be a random selection or a predetermined selection, or a combination thereof.

In general, the 3D object will comprise a plurality of regions or features selected from the group consisting of (i) regions with specific textures, (ii) shadow regions, (iii) reflective regions, (iv) color regions and (v) regions other than the previously mentioned regions. In a specific embodiment, the 3D object will comprise a plurality of regions or features at least selected from the group consisting of (i) regions with specific textures, (ii) shadow regions, (iii) reflective regions, and (iv) color regions. The modified 2D image may be modified in such a way that one, more than one, or all of the plurality of regions are modified. For instance, given a 3D object with three distinct shadow regions, the modified 2D image may be modified in such a way that the projector illuminates the 3D object in one, two or three of these regions. Likewise, such modifications may change in time, i.e., the 3D object is illuminated with a plurality of differently modified 2D images.

Hence, in a specific embodiment, the method comprises consecutively illuminating the 3D object by a projector with a plurality of differently modified 2D images. In this way a kind of living art work may be created ("slide show"). The phrase "consecutively illuminating" does not exclude a temporary absence of illumination by the projector. In general, when performing the method according to the invention, time domains wherein the 3D object is not illuminated at all with a modified 2D image by the projector will not be longer than about 0.5-5 minutes. However, as will be clear to the person skilled in the art, optionally the method of the invention and the projector may be equipped with a "sleep mode", for instance based on a user input signal or sensor input signal. The projector may be manually switched to (or out of) a sleep mode, but also a sensor may for instance sense the presence of humans (spectators) and create an input signal for switching on and/or off the sleep mode, depending upon the absence and/or presence of humans, respectively.

It appears that with the method and projector of the invention, the best results are obtained when the 3D object has a surface roughness characterized by an rms value in the range of about 0.01-50 mm at spatial periods in the range of about 1-5 mm. This means that, given any location at the 3D object, at distances in the range of about 1-5 mm, such as 2 or 4 mm, the rms surface roughness is in the range of about 0.01-5 mm, such as 0.1 or 1 mm. This does not exclude, in an embodiment, the presence of open areas ("holes") in the 3D (art) object.

In a specific embodiment, the projector further comprises a controller arranged to modify one or more features selected from the group consisting of (i) color and (ii) brightness of one or more 2D image regions of the 2D image from the 3D object at a location taken by the image sensor at a point of view to obtain one or more modified image regions of the modified 2D image for projection of the modified 2D image on the 3D object, wherein the 3D object, in the absence of illumination of the 3D object with the modified 2D image by the projector, has, viewed from the point of view, one or more regions having features selected from the group consisting of (i) regions with specific textures, (ii) shadow regions, (iii) reflective regions, (iv) color regions, and (v) regions other than the previously mentioned regions, and wherein the projections of the one or more modified image regions at the 3D object substantially overlap with one or more of the regions at the 3D object. The controller may generate a random and/or predetermined modification in color and/or intensity of the modified image to be projected on the 3D object. Further, the controller may be arranged to control alignment or to control an alignment procedure.

As mentioned above, the projections of the one or more modified image regions at the 3D object substantially overlap with one or more of the regions at the 3D object. To this end, the method may, in an embodiment, further comprise an alignment procedure. For instance, while projecting the modified 2D on the 3D object, a second 2D image of the illuminated 3D object may be captured by an image sensor and it may (automatically be checked) whether the projection of the modified 2D image on the 3D object fits to the 3D object. If not, the modified 2D image may be adapted to fit to the 3D object and/or the alignment of the projector may be optimized. In an iterative process, the modified 2D image(s) and/or alignment of the projector may be corrected until the required alignment is obtained.

As a rule of thumb, the phrase "substantially overlap" corresponds to a difference between an area of an image region and an area of a projection of a modified 2D image on the 3D object on a second 2D image in the range of 0-5%, especially 0-2%. Herein, the term second 2D image refers to an image of the 3D object, in the presence of illumination of the 3D object with the modified 2D image by the projector, as viewed from the point of view. Hence, the term "substantially overlap" refers to the situation that two or more regions overlap each other and have no substantial difference in 2D dimensions (including area), viewed from the point of view.

In addition or alternatively, alignment may also be enabled by a procedure in which a (third) 2D image of the 3D object is provided, wherein, while this image is being captured (from the point of view), a grid is projected on the 3D object. Thereafter, the (third) 2D image of the 3D object with grid projection is projected on the 3D object while the grid is also projected on the 3D object. By aligning the projector, i.e. by an alignment procedure, the projection of the grid and the 2D image of the 3D object with grid projection (i.e. the "third image") can be aligned and a substantial overlap can be achieved. The projection of the grid can be performed by any apparatus, including an optional, additional grid projection device included in the projector according to the invention.

Such an alignment may especially be performed before performing stages a-d of the method of the invention.

While the 2D image and the projection of the 2D image are captured and projected, respectively, from the point of view, the projection of the grid may also be projected from another location.

Herein, the alignment procedure may include one or more of: image alignment of the projector, focal alignment, image projection dimension adaptation, and geometric distortion corrections. The term "image alignment" refers especially to an x,y alignment of the lens of the projector, but may amongst others also refer to the procedure in which the projector is moved in a horizontal and/or vertical direction and/or tilted. The term "geometric distortion correction" includes for instance (horizontal and/or vertical) keystone correction. The term "focal alignment" relates to whether the projection of the image on the 3D object is sharp or blurred. The term "image projection dimension adaptation" relates to the control of the dimensions of the projection of the modified 2D image on the 3D object by enlarging and scaling down. In a specific embodiment, one or more, and more especially all, of: image alignment of the projector, focal alignment, geometric distortion correction and image projection dimension adaptation are controlled by the controller. The controller may control the alignment, based on a predetermined executable instruction and/or on an input signal, such as a user input signal or sensor input signal.

In a further embodiment, the projector may comprise a distance sensor, arranged to sense the distance to the 3D object. Based on the sensed distance and a set of predetermined data, which correlate distance and projector settings such as focal length and image projection dimensions, the projector may project the modified 2D image at the 3D object such that the projection and regions at the 3D object substantially overlap.

As mentioned above, the projector according to the invention further comprises an image sensor with a window of view which at least partly overlaps with the window of view of the beam of light. Thereby, the projector can both view the 3D object and illuminate the 3D object with the beam of light, at least in the overlapping region. The image sensor and the projector (i.e. the projection optics) are selected and arranged in such a way that at least part of the overlapping region is within the focal length of the image sensor lens and within the focal length of the projector lens. Herein, the term "image sensor lens" may refer to a set of lenses, as may for instance be used in cameras, like for instance autofocus systems. Further, the term "projector lens" may refer to a set of lenses, as is usually applied in projectors.

Herein, the projector can be any conventional or dedicated projector which is arranged to display images, especially digital images, and which may further, according to an aspect of the invention, comprise an image sensor. An image sensor may especially be a camera arranged to capture images, especially a digital camera. The camera may also be a plurality of cameras.

The image sensor and the projector may, respectively, capture an image and project a modified image on the 3D object from the point of view, i.e. both use the same location to capture an image of and project a modified image on the 3D object 10.

According to the method of the invention, this may be done in an embodiment by first capturing an image of the 3D object with an image sensor and then replacing the image sensor with the projector. In this way, both are (consecutively) arranged at the point of view. Especially, the difference in location between a final lens of an image sensor and a final lens of a projector is, in an embodiment, not larger than about 20 cm, especially not larger than about 10 cm. In this way, the views are not substantially different, and the window of view of the image sensor may substantially overlap with the beam of light. Herein, the term "final lens" refers to a lens of an image sensor or projector (i.e. projector lens) downstream of which no lenses are arranged, and upstream of which one or more lenses may be arranged. For instance, a projector lens may comprise a plurality of lenses. The lens arranged downstream (with respect to the light source) of all lenses of the plurality of lenses of the projector is indicated as final lens or final lens of the projector.

The final lens of the projector has in general a larger surface than is used by the beam of light to project the modified 2D image. In other words, in general, part of the lens is not used. In a specific embodiment of the projector of the invention, the image sensor is arranged upstream of the final lens of the projector.

In yet another embodiment, an optical axis of the image sensor and an optical axis of the projector may coincide. This may be achieved in different ways.

In an embodiment, the projector may further comprise a beam splitter unit, arranged between the panel and the lens arranged to allow an optical axis of the projector downstream of the beam splitter to substantially coincide with an optical axis of the image sensor downstream of the beam splitter.

In another embodiment, the projector may further comprise a single-lens reflex unit arranged between the panel and the lens arranged to allow an optical axis of the projector downstream of the single-lens reflex unit to substantially coincide with an optical axis of the image sensor downstream of the single-lens reflex unit. The single-lens reflex unit may be constructed to arrange a mirror between the final lens and the panel and redirect the light to the image sensor. In this way, the image sensor may cover substantially the same (range) as the projector does with its beam of light. After having captured the 2D image, the mirror may be removed and the projector may project the modified 2D image, similar to the principle of the single-lens reflex camera in which a viewer sees the same image as that captured by the camera.

Here, given the principle of the beam splitter or single-lens reflex unit, the image sensor may have a window of view that at least partly overlaps with the beam of light of the projector, or that may even entirely overlap, i.e. cover the same range.

In a specific embodiment, the light source comprises one or more monochromatic light sources. Such light source may especially comprise one or more LEDs (light emitting diodes). In yet another embodiment, the light source comprises an ultra-high pressure (UHP) lamp. Hence, in a specific embodiment, the light source can produce only one color of light, but the color is adjustable. This can for example be done with red, green and blue LEDs. In this way, the optics of the projector may become relatively simple: only one panel with a large aperture may be used, and no color filters or color splitting specific optics are necessary. An advantage thereof is a high transmission and a cheap single panel solution. The color can be changed over time. In yet another embodiment the light source comprises a color wheel and a UHP lamp.

BRIEF DESCRIPTION OF THE DRAWINGS

Embodiments of the invention will now be described, by way of example only, with reference to the accompanying schematic drawings in which corresponding reference symbols indicate corresponding parts, and in which.

DESCRIPTION OF PREFERRED EMBODIMENTS

To describe the invention in more detail, first a 3D art object is described in detail. This 3D art object is used as an example to describe and illustrate the invention.

Figure 1A:
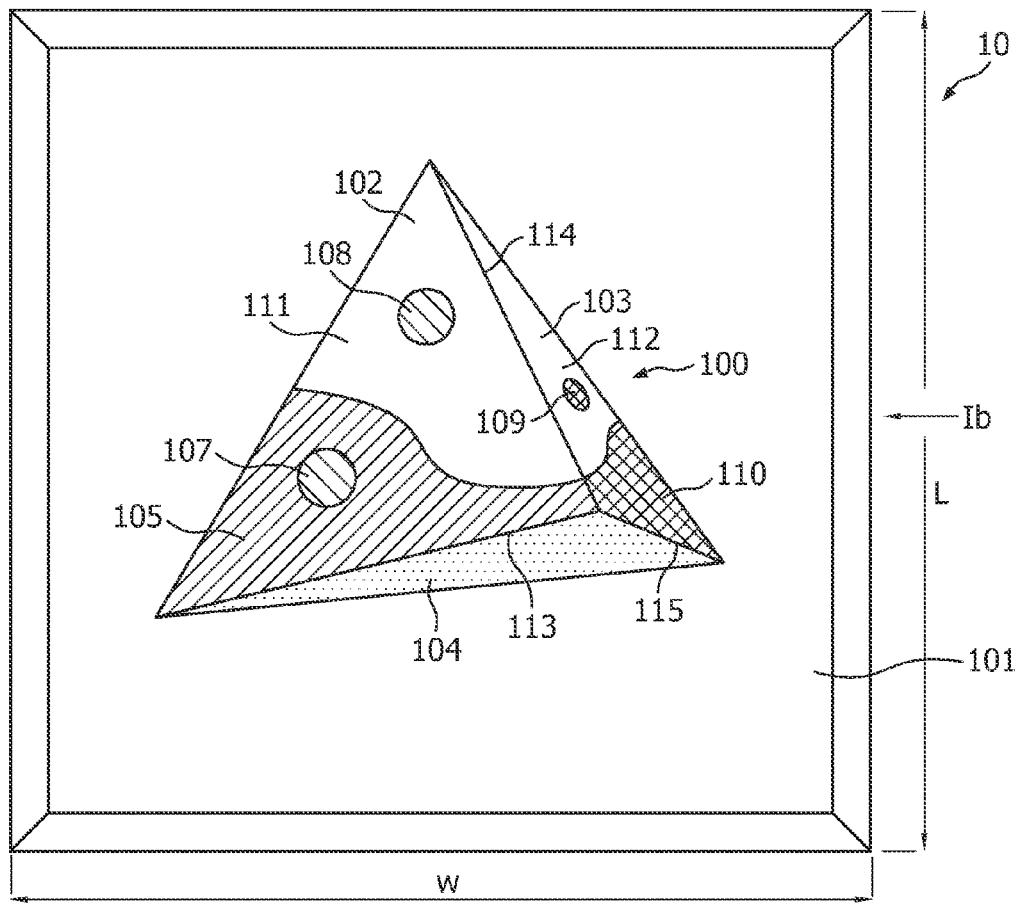
FIGS. 1a, 1b schematically depict in a front view and a side view, respectively, an artistic 3D object ("3D art object")
Figure 1B:
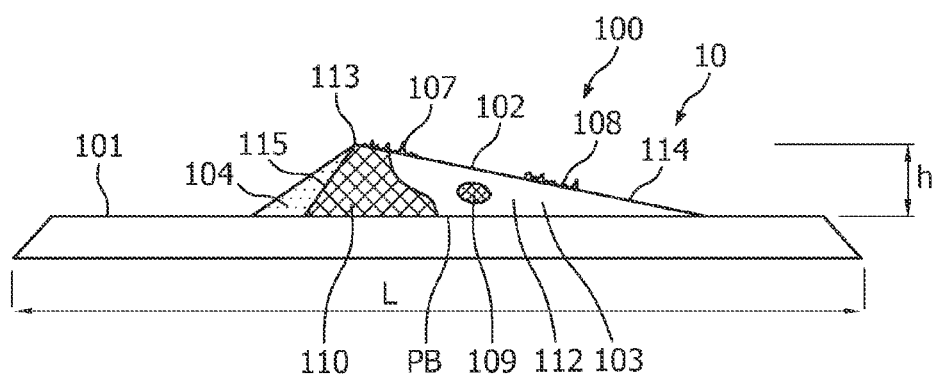

FIGS. 1a and 1b schematically show this 3D object, indicated with reference 10, in a front view and a side view, respectively. 3D object 10 comprises a flat background 101, which in this example may be black. It could for instance be a stretched canvas on a frame or a missive board. On this flat black background 101, a distorted trigonal pyramid 100 is attached. This pyramid 100 has 3 faces, and is attached with its bottom (PB) to the background 101. The pyramid has one large face 102, one smaller face 104 and another smaller face 103. Faces 102 and 103 have an edge 114, faces 102 and 104 have an edge 113 and faces 103 and 104 have an edge 115.

The pyramid 100 has a number of colors and structures on it. Reference number 105 refers to a colored region of face 102, reference number 110 refers to a colored region of face 103. Further, face 103 has a colored region 112. Face 104 is entirely colored with one color. Reference number 111 refers to a reflective region on face 102. The faces 102, 103 and 104 are substantially flat, except for circle like structures 107, 108 and 109, which are textured, with height differences of about 5-10 mm (relative to faces 102 and 103, respectively). As can be seen in FIGS. 1a and 1b, 3D object 10 is not a 2D object, i.e. flat, but a 3D object 10, in that the pyramid 100 projects from the flat background 101, and due to the presence of protruding regions 107, 108 and 109. The 3D object 10 has a width w, a length l. Further, the height of the pyramid relative to the flat background 100 is indicated with reference h (in FIG. 1b).

A rough surface generally comprises a structure, thereby providing a height profile. The height profile of such a surface may be characterized with techniques known in the art. The height profile can be defined as the difference of the local height with respect to the average height of the profile. It is not necessary to define the fully detailed height profile, i.e. it is not necessary to know the height of the profile at every position. A set of numbers describing the key features of the structure will do. A convenient set of numbers is the root mean square (rms) roughness value of the height for a set of characteristic lengths over the surface.

Roughness is frequently characterized using the root mean square value of the sine wave, which can describe the surface of the textured object, i.e. $\frac{1}{2}\sqrt{2}$ times the amplitude of the wave. The wavelength of the sine wave is called the spatial period. The spatial period (i.e. the wavelength) of the roughness is an important quantity for optical components. Note that for real surfaces, the roughness is characterized or specified over a range of spatial periods, since a single spatial period does not describe the whole effect of roughness. This also means that the rms values are calculated using not a single sine wave, but a superposition of sine waves with spatial periods in a certain (bound) range. Best results are obtained when the 3D object 10 has a surface roughness characterized by an rms value in the range of about 0.01-50 mm at spatial periods in the range of about 1-5 mm. In this way, the height h will not vary too much over the 3D object 10.

FIGS. 2a-2e illustrate how the method of the invention can be applied, using the 3D object 10 as described above. The invention is not limited to the herein described 3D object 10. The 3D object 10 is only used as an example of a 3D object 10. In this example, the 3D object 10 is an art object.

Figure 2A:
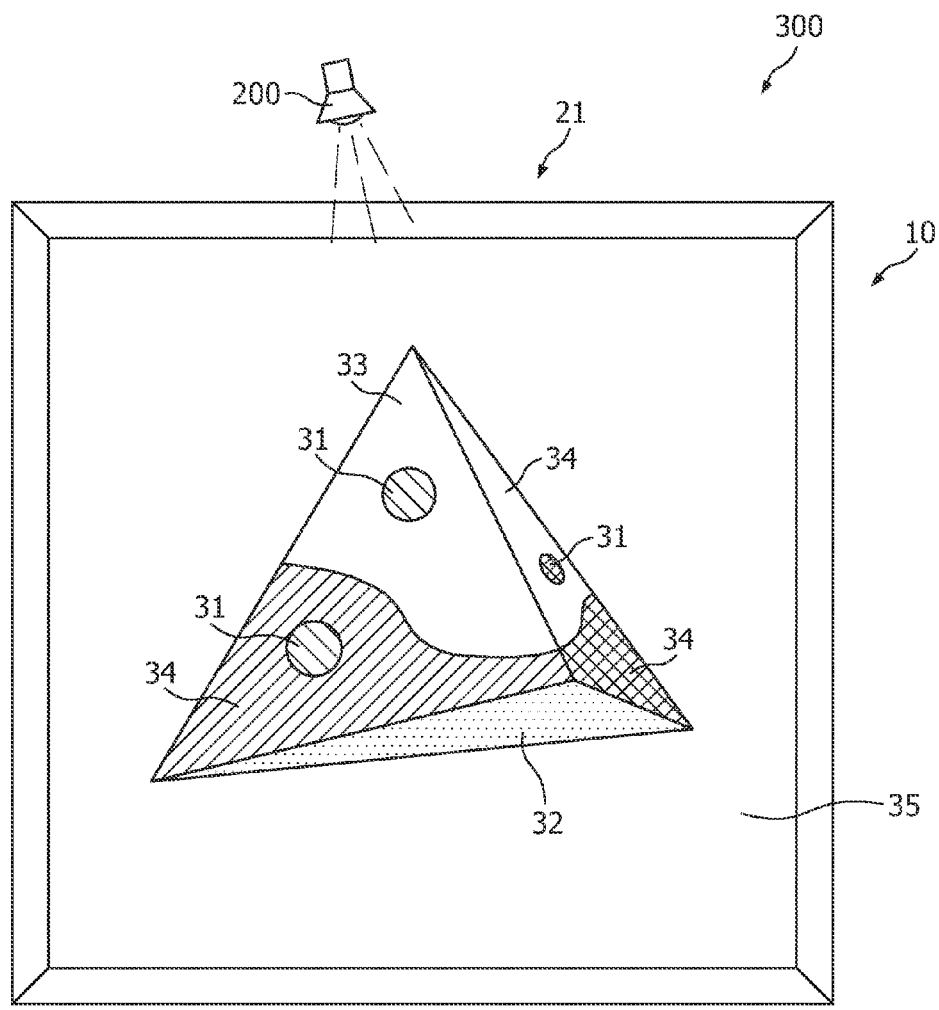
FIGS. 2a-2e schematically depict an embodiment of the method of the invention.

FIG. 2a schematically shows the 3D object in a space 300. Above the 3D object 10 a lamp 200 is provided, which may illuminate the 3D object 10. The 3D object 10 is arranged at location 21 in space 300. Further, at a point of view 25, an image sensor 60, such as a camera, especially a digital camera, is arranged. The image sensor 60 has a window of view 61. The image sensor 60 may be a separate camera, or may be integrated in a projector, as is the case in a number of embodiments of the projector of the invention (see below). The specific positioning of the image sensor 60 relative to 3D object 10 and the specific positioning of lamp 200 are only exemplary.

Here, the 3D object 10 is now described in terms of specific regions of the 3D object 10. For the sake of simplicity, each region is indicated with one reference number specific for that region. Note however that a region may have more than one characteristic/feature. The regions characterized by features are selected from the group consisting of (i) regions with specific textures (31), (ii) shadow regions (32), (iii) reflective regions (33), (iv) color regions (34) and (v) regions (35) other than the previously mentioned regions (31, 32, 33, 34). These regions are indicated in FIG. 2a, and correspond to faces and regions of faces described above and schematically depicted in FIGS. 1a and 1b. Further, table 1 (see below) summarizes the features of the 3D object 10 and the specific regions that can be distinguished on this exemplary 3D object 10.

Figure 2B:
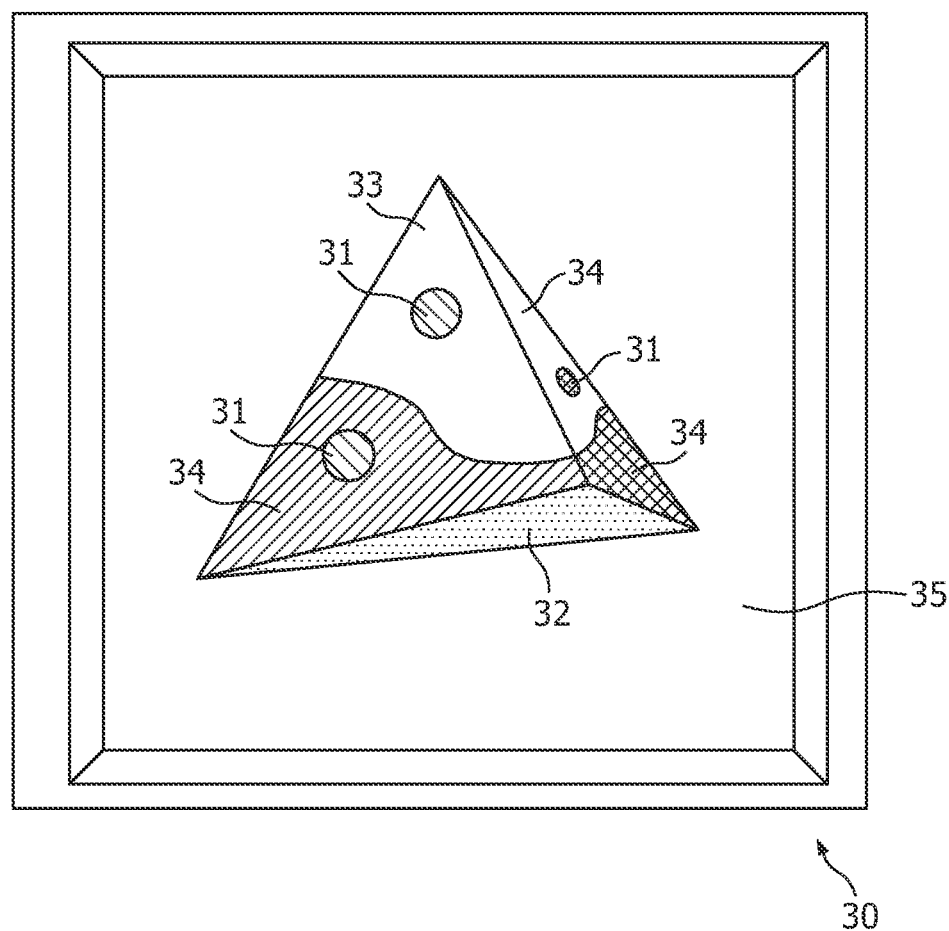
Figure 2C:
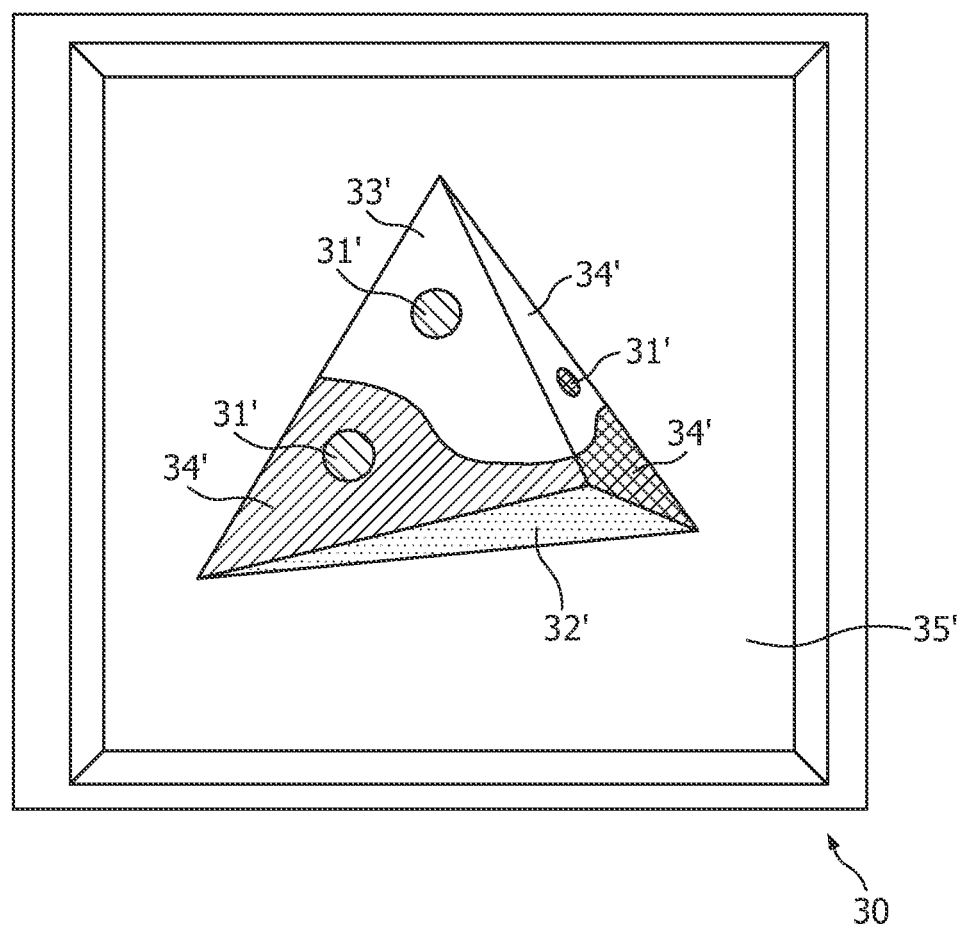

Image sensor 60 may make an image of the 3D object 10. Such an image is a 2D image (per se) and may especially be a digital 2D image. The 2D image obtained is schematically depicted in FIG. 2b, and is indicated in the figure with reference number 30. Herein, image, or 2D image are equal. In order to distinguish the 3D object from a 2D image of the object, the images are "framed".

Now, the different regions on the 2D image 30 are determined and ascribed. A user, whether or not by means of software (such as image recognition software and/or image characterization software), may distinguish between distinct regions (i.e. features). For the sake of simplicity, these regions on the 2D image 30 are referenced 31', 32', 33', 34' and 35', respectively. Note that in principle it is not necessary to know what type of region is distinguished on the 2D image 30, i.e. by what feature the region is characterized. For instance, it might be the case that one cannot distinguish a reflective region from a white region, or one (or software) cannot distinguish a textured region from a black region. Nevertheless, a user and/or software may still be able to distinguish the presence of different regions, since the 2D image 30 will show such regions with different colors and/or brightnesses.

Figure 2D:
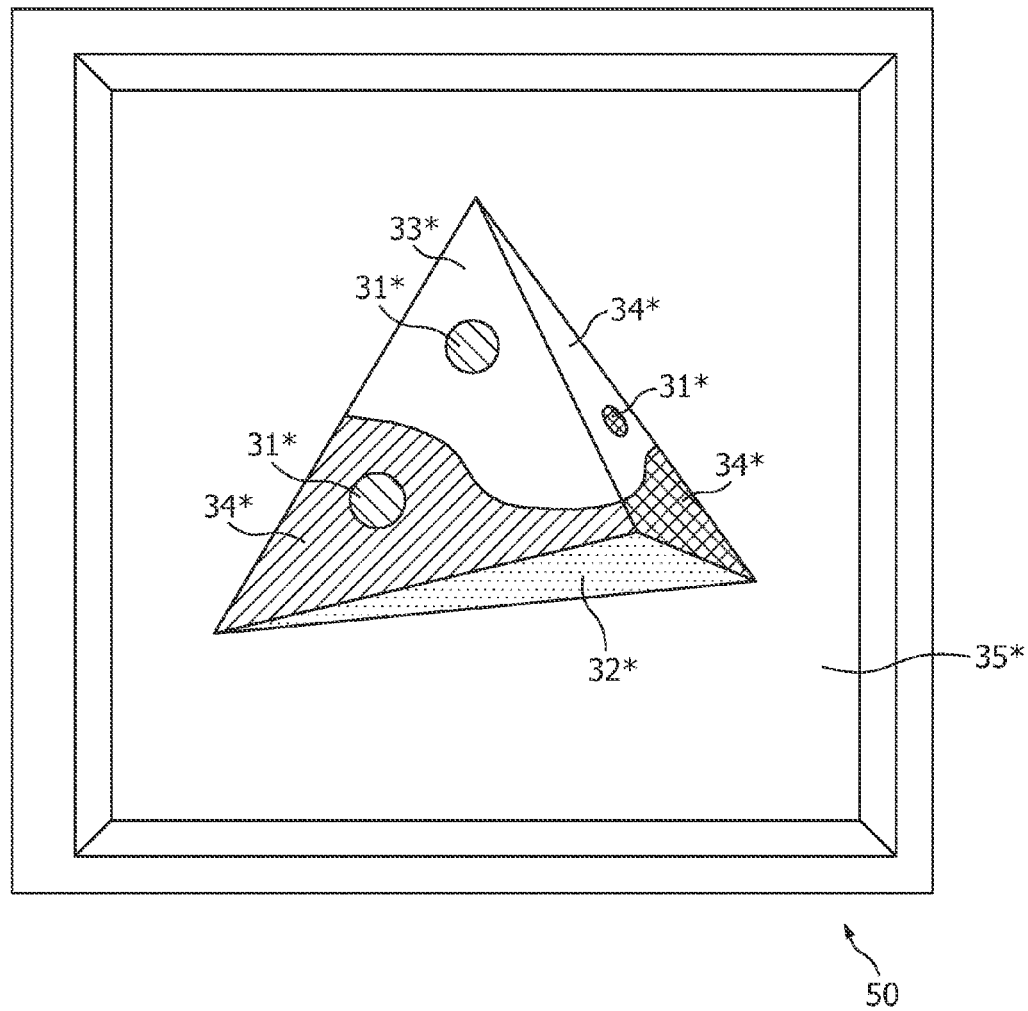

Having determined the different regions on the 2D image 30, a modified 2D image may be designed. Herein, the terms modified image or modified 2D image are equal. Again, this may be done by a user and/or software. FIG. 2d schematically depicts a modified 2D image 50. Note that in this example, by way of example, each region is changed into a modified region. However, one or more regions may be modified, or all regions may be modified. Further, a plurality of modified images 50 may be designed, which may be projected (see below) in a sequence, in which the modifications may differ between the individual modified 2D images 50 of the plurality of modified 2D images 50. Besides, regions may be illuminated (or not) with brightnesses and/or colors changing with time, and a kind of slide show is obtained, which gives the 3D object 10 further artistic features.

instance be modified to region 35* on modified 2D image 50, which region is transparent, thereby allowing illumination of the other region 101, which in this example is black, of the 3D object 10 with intense light.

TABLE 1 reference number for regions on 3D object and 2D images

| Type | 3D object 10 | 2D image 30 | Regions determined on 2D image 30 | Regions on modified 2D image 50 | Example of (non-limiting) possible illumination effects |
|---|---|---|---|---|---|
| Colored region (e.g. red, yellow and blue) | 105, 110, 112 | 34 | 34' | 34* | Colored regions→ bright illumination with white light at different brightnesses. |
| Reflecting region | 111 | 33 | 33' | 33* | Reflecting region → illumination with yellow light |
| Shadow region | 104 | 32 | 32' | 32* | Shadow → weak illumination (fading of shadow) |
| Textured region | 107, 108, 109 | 31 | 31' | 31* | Textured region→ no illumination |
| Other region | 101 | 35 | 35' | 35* | black→ illumination with green light |

Figure 2E:
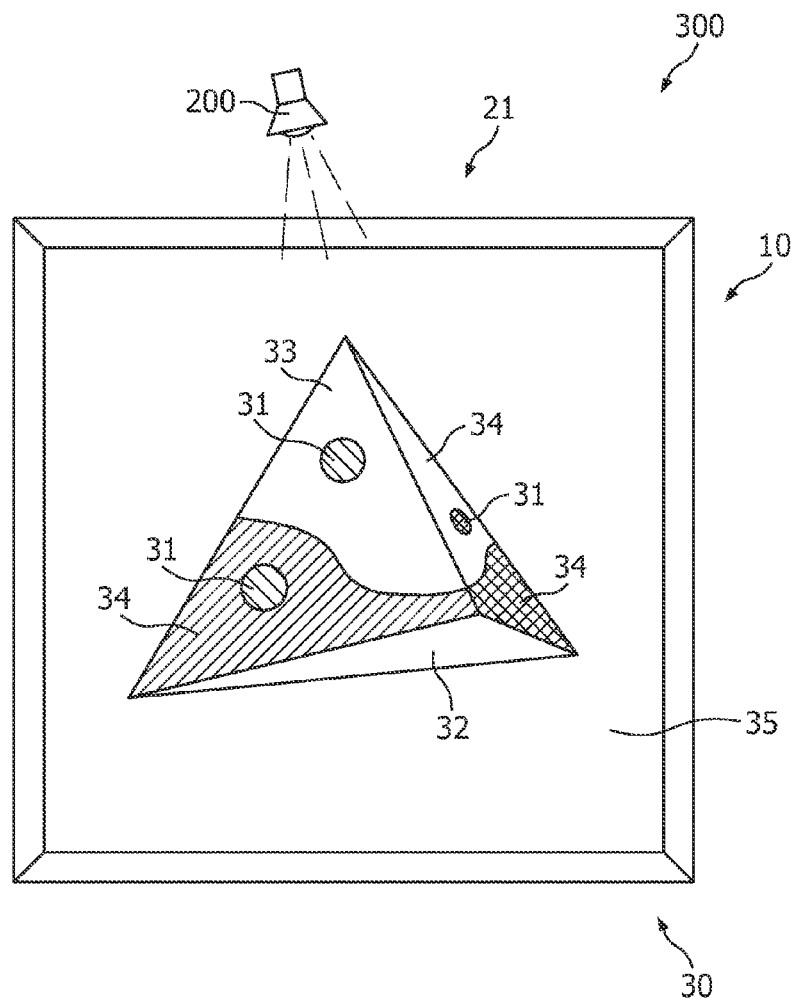
Figure 2E:
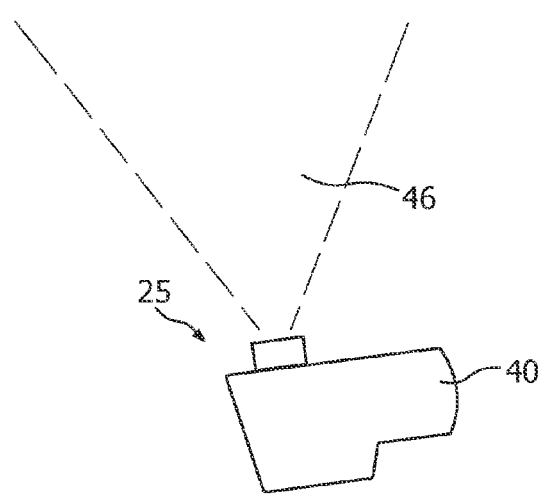

Having designed the modified 2D image 50, this modified 2D image 50 may be projected with a projector on the 3D object 10. This is schematically shown in FIG. 2e. A projector 40, at the same point of view 25 as that at which the 2D image was captured, now projects the modified 2D image 50 of the 3D object 10 on the 3D object 10. One or more regions on the 3D object 10 may now have another color, may or may not be illuminated, shadows may be removed, regions may be brighter than other regions, etc. It is not easy to show this in black and white, but the projector 40 illuminates with beam of light 46 the 3D object 10. The beam of light 46 represents the projector beam, which projects the modified 2D image 50 on the 3D object 10. For the sake of clarity, the projection of the modified image 50 of the 2D object on the 3D object is not displayed in the figure, but since the regions substantially overlap, a projection of modified region N* (such as 33* or 34*, etc.) will correspond to the indicated region N in FIG. 2e (such as 33 or 34, respectively).

In the examples of modifications as indicated in table 1 and described above, it is indicated how modifications can be brought about and what effects may be obtained. Assuming that a source of white light is used as the projector light source (see also below), the 3 regions 34' on the 2D image 30 may for instance be modified to 3 regions 34* with different grey scales, thereby allowing illumination of the three regions 105, 110, 112 at the 3D object 10 with white light from the projector at different intensities (brightnesses). The region 33' on the 2D image may for instance be modified to a region 33* of yellow color on the modified 2D image 50, thereby allowing illumination of the reflecting region 111 of 3D object 10 with yellow light. Shadow region 32' on the 2D image 30 may for instance be modified to region 32* on modified 2D image 50 having a relatively grey/dark appearance, thereby allowing illumination of the shadow region 32 of 3D object 10 with weak light (which can "erase" the shadow on the 3D object 10; this is schematically indicated in FIG. 2e by depicting face 104 with a non-grey appearance, as if the shadow region 32 is now illuminated by projector 40). The regions 31' on the 2D image may for instance be modified to regions 31* on modified 2D image 50, which regions are black, thereby preventing illumination of the textured regions 107, 108 and 109 of 3D object 10. The region 35' on the 2D image may for The projections of the modified regions (31*-35*) on the regions (31-35) substantially overlap, i.e. the projection of the modified region(s) does not substantially overlap with a region on the 3D object 10 to which it does not correspond. For instance, the projection of modified region 33* on region 111 at 3D object 10 should not overlap with regions 108, 104, 105 and 103, etc., but should substantially only overlap with region 33. As described herein, the overlap may be controlled. This may for instance be done by capturing a second 2D image of the 3D object. The term "second" is only used to distinguish from the 2D image 30. The second 2D image is captured while illumination of the 3D object with the modified 2D image 50 by the projector 40 takes place, and is preferably also captured from the point of view 25. Now, in an embodiment the area of one or more image regions (i.e. 31'-35', respectively) on the second 2D image is compared to one or more projections of the corresponding one or more modified regions (i.e. projections of the modified regions 31*-35*, respectively) also on the second 2D image. For instance, when region 31' on the second 2D image has an area x and the area of the projection of the modified region 31*, as also evaluated from this second 2D image, is for example x−0.03× or for example x+0.01×, the difference in the area of the image region and the area of the projection of the modified 2D image on the 3D object on a second 2D image is 3% or 1%, respectively.

In an embodiment, further information might be added to the modified image 50. For instance, letters or number may also be projected on the 3D object.

Figure 3:
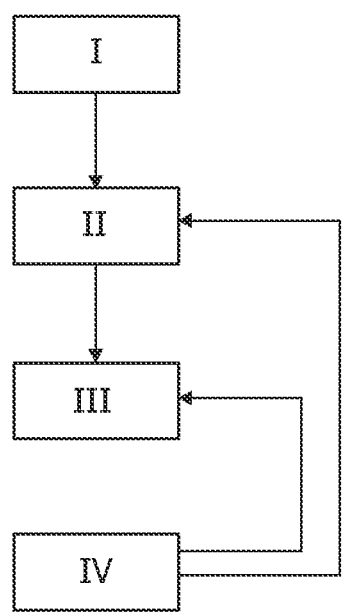
FIG. 3 schematically depicts an embodiment of the method of the invention in a block diagram.

FIG. 3 schematically depicts possible stages in the method of the invention. First, an image-making stage (I) takes place, i.e. a 2D image 30 is captured by the image sensor 60. Then image recognition and image modification takes place (II). Subsequently, the modified 2D image 50 is projected on the 3D object 10 (stage III). Optionally, in a next stage, alignment (IV) may take place. For instance, while projecting the modified 2D image 50 on the 3D object 10, a second 2D image may be captured. Based on the evaluation of the second image, it can be determined whether the projection of the modified regions of the modified 2D image 50 on the regions of the 3D object 10 is acceptable or whether there is too much overlap and/or whether the projected image is not sharp, etc. This may lead to an adaptation of the modified 2D image 50 and/or may lead to image and/or focal alignment, etc. (see above), and thus an alignment procedure may be performed. FIG. 3 schematically depicts an embodiment of the method of the invention. As described above, an alignment procedure may also be performed before image making stage (I), for instance as describe above with respect to a projection of a grid on the 3D object 10. As will be clear, an alignment step may also be performed before the image-making stage and during projecting stage (III).

Figure 4A:
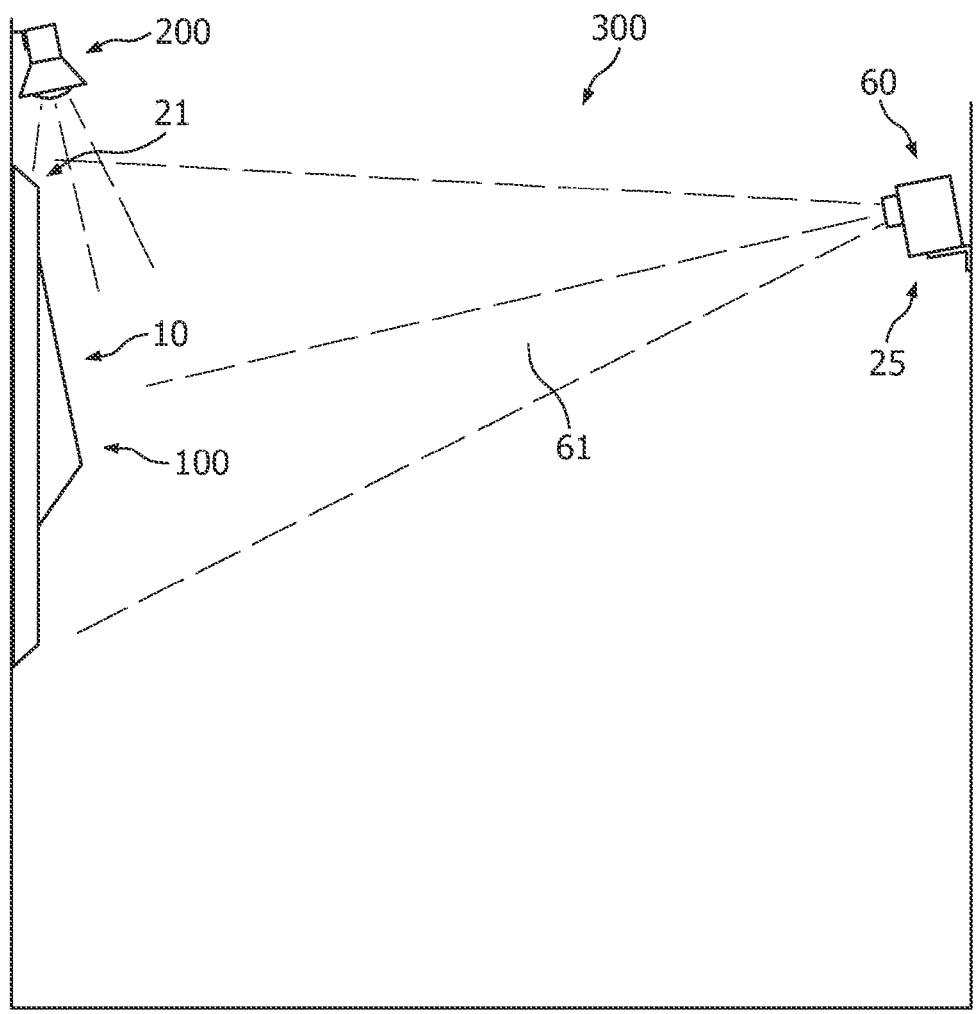
FIGS. 4a-4b schematically depict in side view an embodiment of the method of the invention.
Figure 4B:
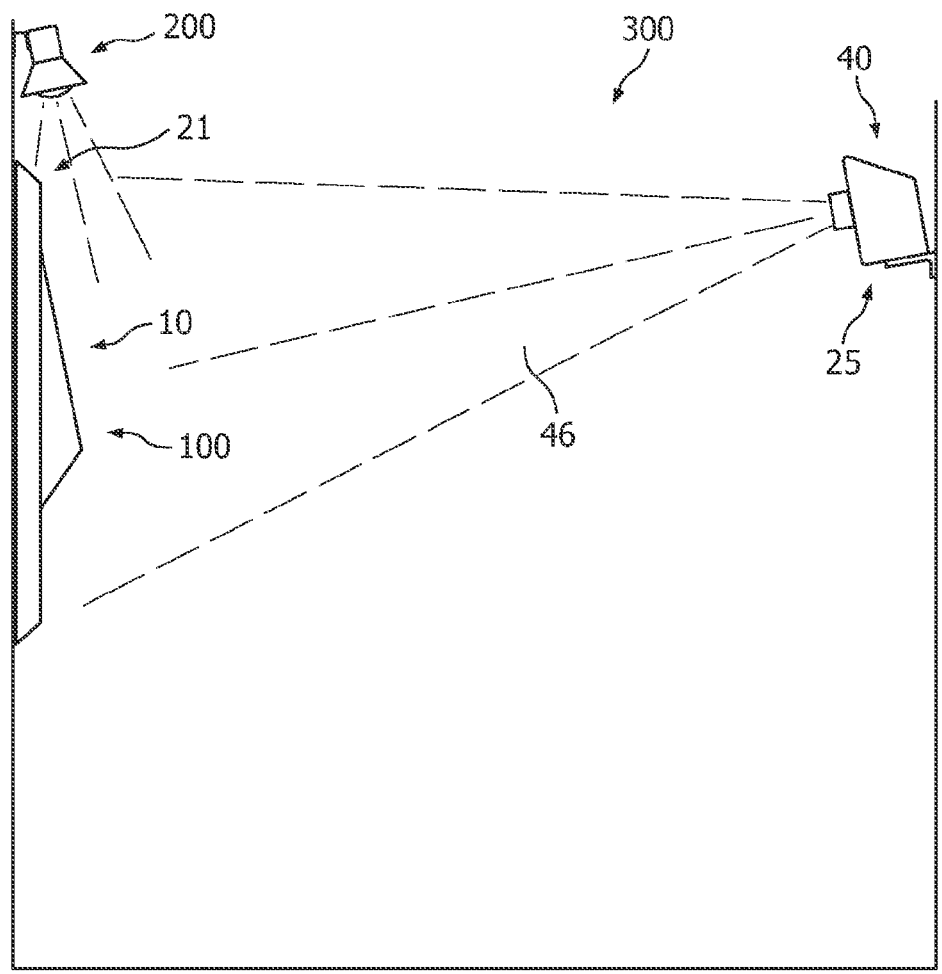

FIGS. 4a and 4b schematically depict in side view the image-making stage (I) wherein a 2D image 30 of the 3D object 10 is made using image sensor 60 (FIG. 4a) and the projection stage (III) wherein the modified 2D image 50 is projected on 3D object 10 (FIG. 4b). In FIGS. 4a and 4b, the image sensor 60 and projector 40 are different devices. However, as described herein, they may also be integrated in one projector device (see also below).

Figure 5A:
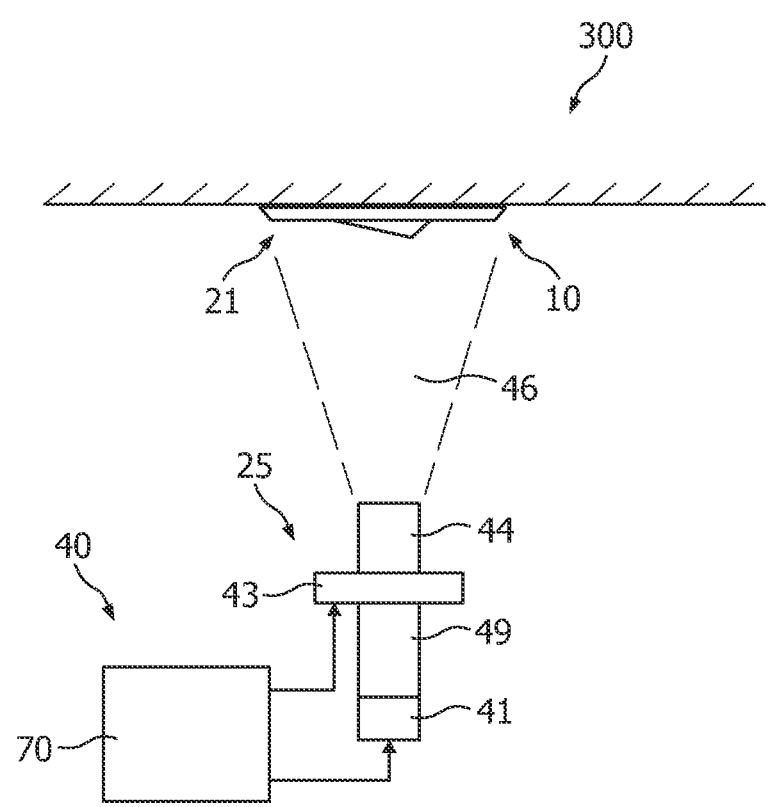
FIGS. 5a-5d schematically depict a prior art projector (5a) and embodiments of the projector according to the invention (5b-5d).
Figure 5B:
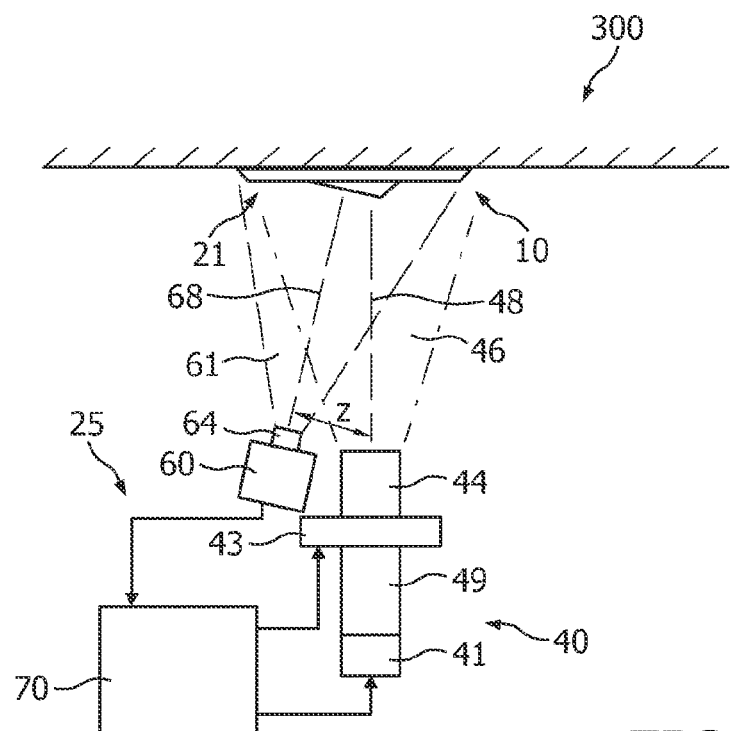
Figure 5C:
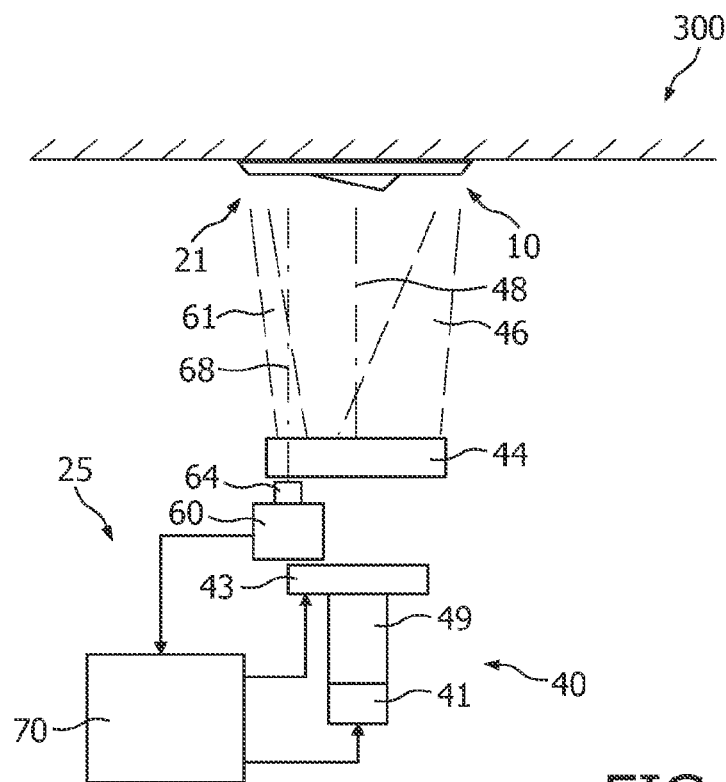
Figure 5D:
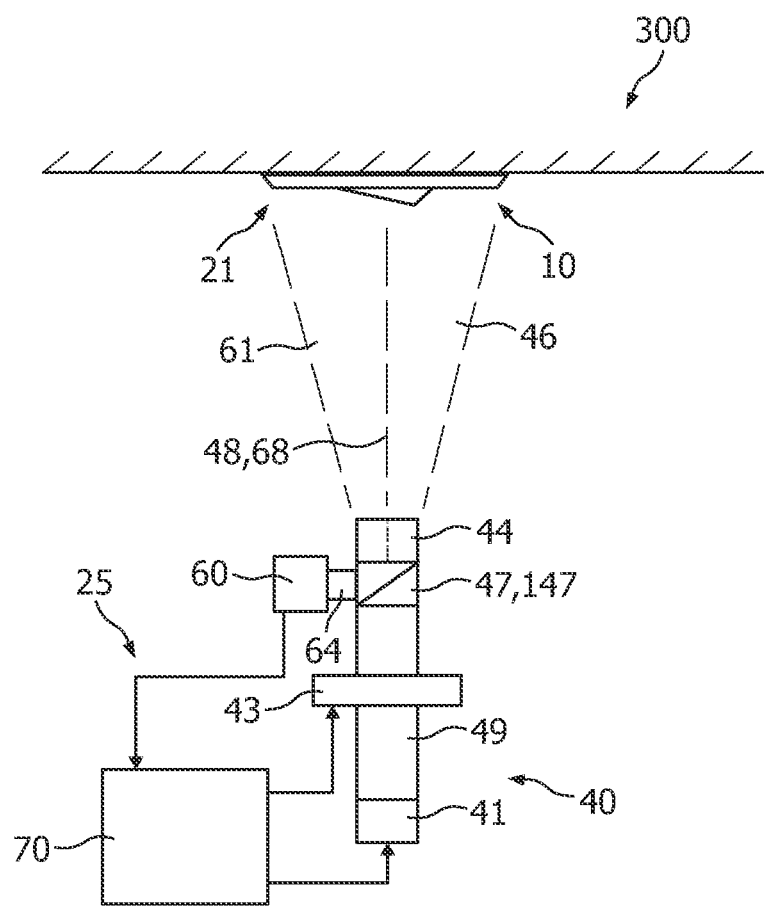

In respect of this, embodiments of the projector 40 according to the invention are further elucidated with reference to FIGS. 5b-5d. First, in FIG. 5a a state of the art projector is schematically shown, as for instance also might be used (see for instance the schematic FIGS. 2e and 4b). In the drawings 5a-5d only the essential items of the projector are schematically shown.

The projector according to the schematic drawing of FIG. 5a comprises a light source 41, illumination optics 49, a panel 43 and a lens or lens unit 44. Further, the projector may comprise a controller 70, for instance for controlling light source 41 and panel 49. The controller 70 may be used to control the light source 41, such as for instance its brightness, but may (in addition) also be used to generate an image, such as the modified 2D image 50 on the panel. Further, the controller 70 may in an embodiment also be applied to modify the 2D image 30 of the 3D object 10 into the modified 2D image 50. In that case, the 2D image 30 may be communicated to the controller from an external source, such as a memory stick, a computer, a digital camera, etc.

For the sake of understanding, the projector 40 is arranged according to an embodiment of the invention at point of view 25, and 3D object 10 is arranged at location 21. Further, the beam of light 46 is shown, which may project the modified 2D image 50 on the 3D object 10. FIG. 5a is a schematic drawing of a state of the art projector, which may be applied in an embodiment of the method of the invention.

FIGS. 5b-5d schematically depict embodiments of the projector 40 according to the invention, wherein the projector 40 further comprises image sensor 60. The image sensor 60 may be integrated in the projector or projector device 40 in a number of ways. Herein, the projector 40 according to the invention is also indicated as projector device.

FIG. 5b shows an option wherein the image sensor 60 is arranged sideways of the lens 44. Reference 64 refers to a final lens of the image sensor 60. As shown in FIG. 5b, the window of view 61 of the image sensor 60 and the beam of light 46 at least partly overlap. Herein the phrase "wherein the beam of light and window of view" at least partly overlap" relates to projector or projector device 40 wherein the image sensor 60 and projector, i.e. especially the light source 41, projection optics 49, panel 43 and lens 44, are arranged to have a window of view 61 and beam of light 46 (during use of the projector 40), respectively, which at least partly overlap, i.e. in use, the beam of light 46 at least partly overlaps with the window of view 61 of the image sensor 60. This is further illustrated by showing the optical axis of the image sensor 60 and projector 40. Projector 40 has an optical axis 48 and image sensor 60 has an optical axis 68. In the embodiment, schematically depicted in FIG. 5b, the axes may intersect at one point in space. However, in another embodiment, these axes may be substantially parallel.

Especially in this embodiment, a difference z in location between the final lens 64 of the image sensor 60 and the final lens 44 of the projector 40 is not larger than about 20 cm, especially not larger than about 10 cm. In this way, the views are not substantially different, and the window of view of the image sensor may substantially overlap with the beam of light.

The (final) lens 44 of the projector 40 has in general a larger surface than is used by the beam of light 46 to project the modified 2D image 50. In other words, in general, part of the lens 44 is not used. In a specific embodiment of the projector 40 of the invention, the image sensor 60 is arranged upstream of the final lens 44 of the projector 40. This is schematically indicated in FIG. 5b. In this way, the window of view 61 and beam of light 46 may substantially overlap. As mentioned herein, lens 44 is also indicated as "final lens".

Herein, the terms "upstream" and "downstream" are used relative to the source of light or light source 41. Objects in the projector 40 closer to the light source 41 and in the optical path between light source 41 and (final) lens 44 are upstream relative to other objects farther away from the light source 41 and also in the optical path between light source 41 and final lens 44. For instance, final lens 44 is downstream of panel 43.

In a further specific embodiment, as schematically depicted in FIG. 5d, a beam splitter 47 or single-lens reflex unit 147 is arranged in between the lens 44 and panel 43, i.e. upstream of lens 44 and downstream of panel 43. In the figure, this is indicated with reference 47,147. In general, either the beam splitter 47 or the single-lens reflex unit 147 is present.

The beam splitter may be a polarizing beam splitter. Further, the beam splitter 47 may be a beam splitter that splits the light in ratios of 10-90:90:10, such as in a 50-50 ratio, or such as in a 80-20 (or 20-80) ratio. Especially, the part directed to the image sensor 60 is smaller than the part "open" to the panel (for instance image sensor:panel=10:90). However, in a specific option, the beam splitter 47 is removable, in the sense that the beam splitter 47 is only present when the image sensor 60 captures an image, whereas when the modified 2D image 50 is projected on the 3D object 10, the beam splitter 47 is removed. Such an embodiment with a removable beam splitter 47 is similar to the embodiment wherein the projector 40 comprises single-lens reflex unit 147. In the embodiments with beam splitter 47 or with single-lens reflex unit 147, the optical axis 48 of the projector 40 and the optical axis 68 of the image sensor 60 may coincide. Further, as schematically shown in FIG. 5d, the beam of light 46 and the window of view 61 may substantially overlap.

The image sensor 60 implemented in the projector 40 can be used to perform an alignment procedure, in that a second 2D image of the 3D object 10, while being illuminated with the modified 2D image 50, may be captured by the image sensor 60, and the quality of the projection of the modified 2D image 50 on the 3D object 10 is evaluated. When the projection is not sharp and/or when there is undesired overlap, the projector may be aligned/and or the modified 2D image 50 may be further modified. In an iterative process, the quality of the projection may be enhanced to the desired quality. To this end, also controller 70 may be used.

The controller 70 may comprise a memory, an input-output unit and a processor (not depicted). Especially, the controller 70 may comprise a memory, with executable instructions, an input-output unit, configured to (i) receive one or more input signals from one or more elements selected from the group consisting of (1) one or more sensors and (2) a user input device and (ii) send one or more output signals to control one or more of, and especially all of, the alignment of the projector 40, the intensity of the light source 41 and the modification of the 2D image 30 to a modified 2D image 50; and a processor designed to process the one or more input signals into one or more output signals based on the executable instructions.

The light source 41 may be embodied to be an UHP lamp, such as in conventional projectors, but may alternatively be selected from one or more LEDs, such as white emitting LEDs, triband LEDs, or monochromatic light emitting LEDs (i.e. LEDs emitting one color, such as blue, green, yellow, amber, orange or red). The projector 40 does not necessarily have a light source that emits white light. In an embodiment, LEDs emitting different colors are combined, for instance to provide colored and white light, depending upon the selection of LEDs and their respective emission intensities. In an embodiment, LEDs emitting red, green and blue can be combined in different intensities to realize any single color and white light.

The panel 43 is especially a conventional panel, which is a panel that displays computer generated images. However, in another embodiment, the panel is a plate with holes corresponding to one or more regions, i.e. the one or more holes correspond to one or more modified regions.

In an embodiment, the image sensor 60 may also comprise a plurality of image sensors. Based on a plurality of images, 2D image 30 may be provided as if it was viewed from point of view 25. In this way, for instance stereo images may be used and, optionally, 3D depth information can be retrieved from these images.

The projector 40 and image sensor 60 are herein often described while "in use". As will be clear to the person skilled in the art, the invention is also directed to devices which are not in use, but which are constructed to perform the described behavior or process or method when they are in use.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

| Reference symbols | |
|---|---|
| 10 | 3D art object |
| 100 | trigonal pyramid-like object |
| 101 | flat background |
| 102 | face of the pyramid extending from the flat background 101 |
| 103 | face of the pyramid extending from the flat background 101 |
| 104 | face of the pyramid extending from the flat background 101 |
| 105 | colored region of face 102 |
| 107 | protruding region with relief on face 102 |
| 108 | protruding region with relief on face 102 |
| 109 | protruding region with relief on face 103 |

| Reference symbols (continued) | |
|---|---|
| 110 | colored region of face 103 |
| 111 | reflecting region of face 102 |
| 112 | colored region of face 103 |
| 113 | edge between face 102/104 |
| 114 | edge between face 102/103 |
| 115 | edge between face 103/104 |
| 147 | single-lens reflex unit |
| 200 | lamp for illumination of 3D object 10 |
| 21 | location of 3D object 10 |
| 25 | point of view |
| 30 | 2D image of 3D object |
| 300 | space |
| 31 | regions with specific textures on 3D object |
| 31* | regions with specific textures on modified 2D image 50 |
| 31' | regions with specific textures on 2D image 30 |
| 32 | shadow regions on 3D object |
| 32* | shadow regions on modified 2D image 50 |
| 32' | shadow regions on 2D image 30 |
| 33 | reflective regions on 3D object |
| 33* | reflective regions on modified 2D image 50 |
| 33' | reflective regions on 2D image 30 |
| 34 | color regions on 3D object |
| 34* | color regions on modified 2D image 50 |
| 34' | color regions on 2D image 30 |
| 35 | regions on 3D object other than regions (31, 32, 33, 34) |
| 35* | regions on modified 2D image 50 other than regions (31*, 32*, 33*, 34*) |
| 35' | regions on 2D image 30 other than regions (31', 32', 33', 34') |
| 40 | projector |
| 41 | light source |
| 43 | panel |
| 44 | (final) lens of projector 40 |
| 46 | beam of light |
| 47 | beam splitter |
| 48 | optical axis of the projector 40 |
| 49 | illumination optics |
| 50 | modified 2D image of 3D object |
| 60 | image sensor |
| 61 | window of view of image sensor 60 |
| 64 | (final) lens of image sensor 60 |
| 68 | optical axis of the image sensor 60 |
| 70 | controller |
| h | height 3D of art object 10 |
| l | length 3D of art object 10 |
| w | width 3D of art object 10 |
| PB | bottom of pyramid 100 |

The invention claimed is:

1. A method of illuminating a 3D object at a location with a modified 2D image of the 3D object, by a projector arranged at a predetermined point of view, wherein the 3D object, in the absence of illumination of the 3D object with the modified 2D image by the projector, has, viewed from the point of view, one or more features selected from the group consisting of (i) regions with specific textures, (ii) shadow regions, (iii) reflective regions, (iv) color regions and (v) other regions, wherein the method comprises:
providing a 2D image of the object captured by an image sensor from the point of view in the absence of illumination of the 3D object with the modified 2D image by the projector;
determining one or more 2D image regions on the 2D image corresponding to the one or more features selected from the group consisting of (i) regions with specific textures, (ii) shadow regions, (iii) reflective regions, (iv) color regions and other regions at 3D object;
modifying at least one of the one or more 2D image regions of the 2D image by changing color and/or brightness to obtain one or more modified image regions of the modified 2D image;

illuminating the 3D object by projector by projecting the modified 2D image on the 3D object, wherein the projections of the one or more modified image regions at the 3D object substantially overlap with one or more of the regions at the 3D object.

2. The method according to claim 1, wherein the change of color and/or brightness is a random change.

3. The method according to claim 1, wherein the method comprises consecutively illuminating the 3D object by projector with a plurality of differently modified 2D images.

4. The method according to claim 1, wherein the 3D object has a surface roughness characterized by an rms value in the range of 0.01-50 mm at spatial periods in the range of 1-5 mm.

5. The method according to claim 1, wherein the method further comprises an alignment procedure.

* * * * *